US012736366B2

(12) United States Patent
Jeong et al.

(10) Patent No.: US 12,736,366 B2
(45) Date of Patent: Sep. 15, 2026

(54) ELEVATION IN TRAVERSABLE SURFACE MAPS FOR AUTONOMOUS VEHICLE NAVIGATION

(71) Applicant: Zoox, Inc., Foster City, CA (US)

(72) Inventors: Byungil Jeong, San Ramon, CA (US); Gail Renee Pinto, Foster City, CA (US); Botong Qu, Redwood City, CA (US)

(73) Assignee: Zoox, Inc., Foster City, CA (US)

(*) Notice: Subject to any disclaimer, the term of this patent is extended or adjusted under 35 U.S.C. 154(b) by 110 days.

(21) Appl. No.: 18/612,630

(22) Filed: Mar. 21, 2024

(65) Prior Publication Data

US 2025/0297866 A1 Sep. 25, 2025

(51) Int. Cl.
*G01C 21/00* (2006.01)

(52) U.S. Cl.
CPC ..... *G01C 21/3815* (2020.08); *G01C 21/3867* (2020.08); *G01C 21/3881* (2020.08)

(58) Field of Classification Search
CPC ............ G01C 21/3815; G01C 21/3867; G01C 21/3881; G01C 21/3822; G01C 21/3878
See application file for complete search history.

(56) References Cited

U.S. PATENT DOCUMENTS

2013/0328924 A1* 12/2013 Arikan .................... G06T 11/00 345/629
2016/0062361 A1* 3/2016 Nakano ................ G05D 1/0088 701/25
2017/0193682 A1 7/2017 Lynch
2018/0052005 A1* 2/2018 Schilling ................. H04W 4/70
2018/0285052 A1* 10/2018 Eade ..................... G06F 3/1423
2023/0126130 A1 4/2023 Jeong et al.
2023/0127185 A1 4/2023 Jeong et al.

FOREIGN PATENT DOCUMENTS

| | | | |
|---|---|---|---|
| JP | 09304106 | A | 11/1997 |
| JP | 2001296132 | A | 10/2001 |
| JP | 2014232196 | A | 12/2014 |
| KR | 20180027239 | A | 3/2018 |

OTHER PUBLICATIONS

International Search Report and Written Opinion dated Jul. 4, 2025 for PCT International Application No. PCT/US2025/019846.

* cited by examiner

*Primary Examiner* — Jason Holloway
*Assistant Examiner* — Godfrey Aleksander Maciorowski
(74) *Attorney, Agent, or Firm* — EIP US LLP

(57) ABSTRACT

Techniques are provided comprising receiving map data and determining a first polygon representing a first traversable surface and a second polygon representing a second traversable surface. The first polygon may include a first portion that overlaps with a second portion of the second polygon. The techniques may determine, based at least in part on elevation information associated with the first traversable surface and the second traversable surface, respective elevation layers associated with the first polygon and the second polygon. It may be determined whether to merge the first polygon and the second polygon based at least in part on whether the first polygon is associated with a same elevation layer as the second polygon. Based at least in part on determining whether to merge the first and second polygons, an updated map may be determined.

20 Claims, 8 Drawing Sheets

ELEVATION IN TRAVERSABLE SURFACE MAPS FOR AUTONOMOUS VEHICLE NAVIGATION

BACKGROUND

A map of an environment may include various types of information that is usable by a vehicle when travelling through an environment. For example, a map may include information indicating various types of drivable surfaces such as road segments and may indicate non-drivable surfaces such as sidewalks. When planning motion through the environment, a vehicle may reference the map to determine a path, speed, etc. As such, accurate and robust map data can contribute to the vehicle executing maneuvers that efficiently and effectively use drivable surfaces.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
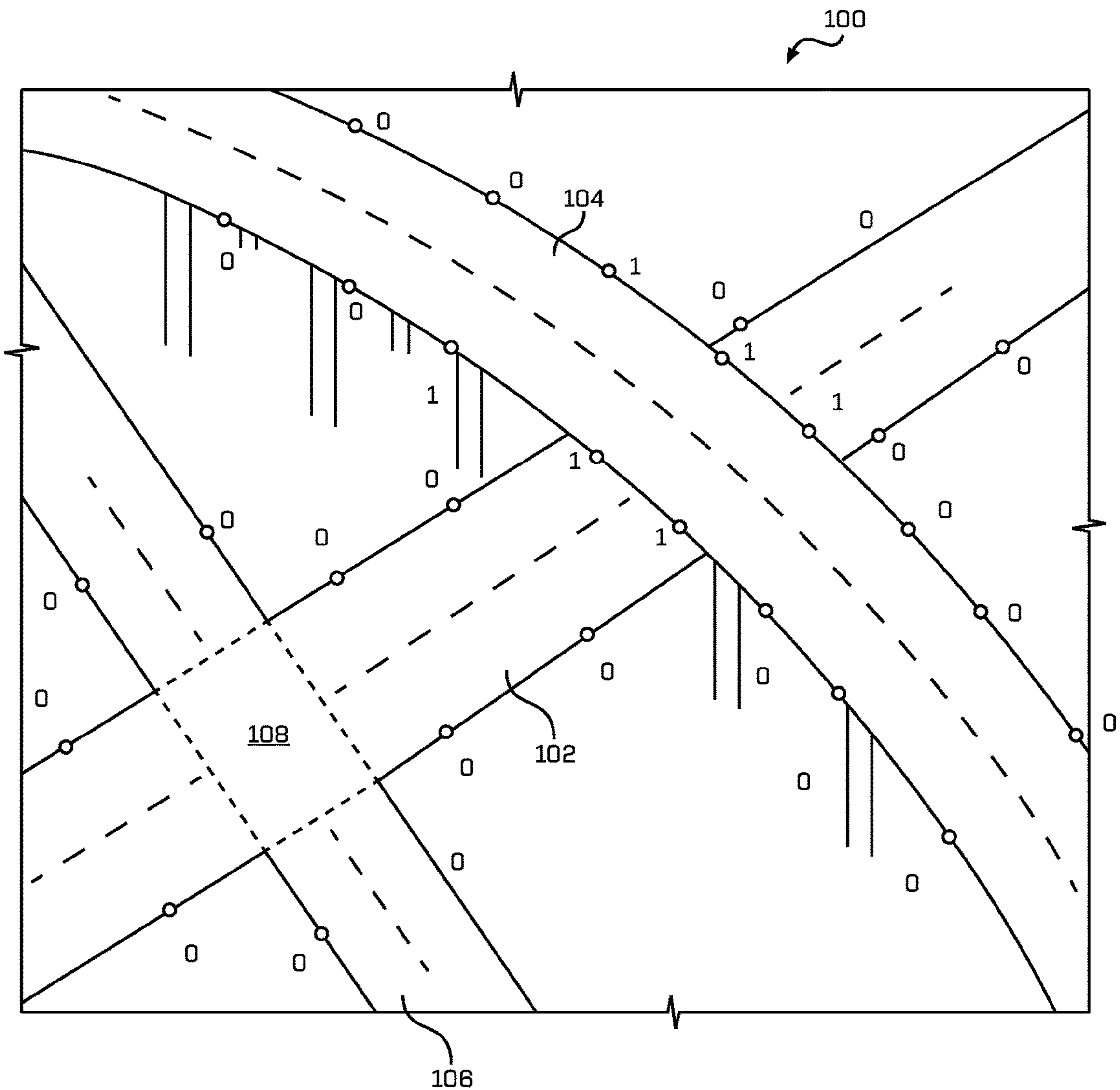
FIG. 1 illustrates an example environment in which a vehicle may operate.

As described above, maps may be used by vehicles in various contexts, such as trajectory planning, teleguidance (e.g., navigating an environment via remote assistance), or other motion-planning operations. In techniques of the present disclosure, map data may be generated that indicates a total drivable surface. For example, the techniques may combine multiple drivable surfaces (e.g., road segments), and/or multiple types of drivable surface (e.g., road segments and parking lots), to generate combined map data indicating an overall drivable surface and/or a boundary between a drivable area and a non-drivable area. Such map data may be provided to vehicles traversing an environment represented by the map data and may allow the vehicles to make planning decisions based at least in part on the available drivable area. As a non-limiting example, the map data may indicate a parking area to be part of an overall drivable surface. The vehicle may use the map data to determine that it can move into the parking area from a road lane, for example to provide space for an emergency vehicle to pass.

In examples, the total drivable area may be determined based at least in part on two-dimensional map data. For example, map data may represent an environment as a top-down view. The techniques may identify drivable surfaces, such as road segments, and may merge or 'clip' representations of such drivable surfaces into the total drivable surface. However, in two-dimensions two (or more) surfaces may overlap though separated in height. In a non-limiting example, a first road may pass under a second road, without interacting with that road (e.g., without a ramp connecting the first road to the second road, at least proximal to the overpass position). Considered in two-dimensions, it may appear that the first road crosses the second road, similarly to a junction. When joining road segments to form a total drivable surface based on such two-dimensional data, both the road segments of the first road and second road may be combined together as part of the total drivable surface. This may result in inaccurate map data being provided to a vehicle, which may impact operation of the vehicle. For example, consider a first vehicle travelling on the first road which passes under the second road. Sensors of the first vehicle may observe a second vehicle travelling on the second road. If the map data provided to the first vehicle indicates that the first and second roads are together part of the same combined total drivable area, the first vehicle may interpret the second vehicle as being on an intercepting path to the first vehicle, whereas in fact the second vehicle would pass safely overhead. The first vehicle may take unnecessary action to avoid approaching the second vehicle, for example slowing down or changing direction, which may be inefficient, uncomfortable for occupants, and/or confuse other vehicles on the road with possible safety impacts.

Techniques of the present disclosure may incorporate elevation information when determining a total drivable area. Such techniques may for example use elevation metadata or annotations associated with two-dimensional map data to combine road segments associated with different elevation layers into separate drivable areas. The resulting map data may be provided to vehicles, which may use the data to control the vehicle within a first total drivable area, and/or to identify that a second drivable area (e.g., an overpassing road), does not interact with the current path of the vehicle. By determining the total drivable area, the techniques disclosed herein may allow for more efficient querying of map data, for example by a vehicle traversing an environment represented by the map, than for map data in which road features are represented by a number of individual road elements. Furthermore, the total drivable area may include areas extending beyond standard driving lanes, such as parking lanes or parts of junctions that are not within lanes. Such extra areas may allow a vehicle to navigate through an environment in unusual situations, such as where there is a blockage in the road. In contrast, standard map data may represent only standard driving lanes, which may restrict vehicle operation to those lanes even in situations where a human driver would make use of other road surfaces.

Accordingly, some techniques of the present disclosure comprise receiving first map data associated with an environment, the first map data comprising a first polygon representing a first traversable surface and a second polygon representing a second traversable surface, wherein the first polygon includes a first portion that overlaps with a second portion of the second polygon; determining, based at least in part on elevation information associated with the first traversable surface and the second traversable surface, respective elevation layers associated with the first polygon and the second polygon; and determining whether to merge the first polygon and the second polygon based at least in part on determining whether the first polygon is associated with a same elevation layer as the second polygon. The techniques may comprise determining an updated map based at least in part on determining whether to merge the first and second polygons. For example, if the first polygon is associated with the same elevation layer as the second polygon, the techniques may comprise generating an updated map (or second map data) by removing, from the first map data, the first portion of the first polygon and/or second portion of the second polygon (e.g., forming at least part of a total drivable area). If the first polygon is not associated with the same elevation layer as the second polygon, the techniques may comprise generating the updated map from the first map data, the updated map including the first portion of the first polygon. The updated map may be provided to a control system (e.g., a localization, perception, prediction, and/or planning component) of a vehicle, the control system configured to control operation of the vehicle based at least in part on querying the updated map. For example, the control system may query the updated map to determine if a current position of the vehicle is on a drivable surface, or to determine one or more boundaries of a drivable surface.

In some examples the first traversable surface or second traversable surface may comprise one or more of: a road segment, a parking lot, a parking spot, a parking lane, a driveway, a bike lane, a junction, a sidewalk, a pedestrian overpass, or a pedestrian underpass.

The elevation layers, such as the first elevation layer and second elevation layer, may be or represent classes of elevation. For example, surfaces at a first range of elevations may be allocated to (or otherwise associated with) a first elevation layer, and surfaces at a second range of elevations may be allocated to (or otherwise associated with) a second elevation layer. In other examples, the elevation layer may represent an ordering of surfaces that vertically overlap. For example, a lowest level of surfaces, such as roads, may be assigned to a first elevation layer. Surfaces which pass over lowest-level surfaces may be assigned to a second elevation layer. Surfaces which pass over the second elevation layer surfaces may be assigned to a third elevation layer, and so on. In some examples the elevation layer of a surface may be determined based at least in part on an elevation layer indication in map data, based at least in part on an elevation or altitude value or range of the surface (e.g., associated with map data), and/or based at least in part on topological connections (or generally associations) to other surfaces or road features such as junctions (e.g., an elevation layer for a first surface may be determined based at least in part on an elevation layer of a neighboring second surface).

In some examples the first map data may comprise a third polygon representing a third traversable surface. Such examples may comprise determining, based at least in part on elevation information associated with the third traversable surface, that the third polygon is associated with a transition layer between a first elevation layer and a second elevation layer; allocating, based at least in part on the third polygon being associated with the transition layer, the third polygon to the second elevation layer; and removing a portion of the third polygon overlapping with a polygon associated with the second elevation layer. Such examples may allow surfaces such as ramps that extend from one elevation layer to another to be combined into an appropriate drivable area.

In some such examples, the first map data may comprise a fourth polygon representing a fourth traversable surface, the techniques comprising: determining, based at least in part on elevation information associated with the fourth traversable surface, that the fourth polygon is associated with the first elevation layer; identifying, based at least in part on the first map data, a topological connection or association between the fourth traversable surface and a third traversable surface associated with a second elevation layer; and based at least in part on the topological connection between the fourth traversable surface and the third traversable surface, assigning the fourth polygon to the second elevation layer. Such example may use connections between surface to determine where to allocate a surface. For example, the elevation information associated with the first map data may only relate to particular sampling points. It may not be clear between sampling points which elevation layer a surface belongs to (e.g., where a surface starts to rise up to a higher elevation layer and/or transition layer). Examples may therefore use topological connections between surfaces to help deduce elevation information, and to allocate surfaces to an appropriate combined drivable area.

Some such examples may comprise identifying the topological connection between the fourth traversable surface and the third traversable surface based at least in part on the fourth traversable surface being a successor or predecessor to the third traversable surface in the first map data. For example, a traversable surface (e.g., road segment) in the first map data may be associated with an identifier identifying connecting surfaces, such as the next road segment along the road in a defined direction. Alternatively or additionally, such examples may comprise identifying the topological connection between the fourth traversable surface and the third traversable surface based at least in part on the fourth traversable surface and the third traversable surface being associated with a same road junction. In other words, the topological connection may in some examples be a connection between neighboring traversable surfaces, and/or an association with a common junction.

Some examples may comprise dividing the first map data into hierarchical spatial tiles. For example, techniques may comprise dividing the first map data into a plurality of parent tiles; and dividing at least one parent tile into a plurality of tiles. Storing data in spatially indexed tiles (e.g., a quadtree structure) may provide the second map data in a form that is conducive to searching, for example for searching for information on drivable areas or boundaries of drivable areas. The techniques may comprise removing overlapping portions of polygons based at least in part on the overlapping portions being associated with a same elevation layer and a same tile. Thus in some examples, two polygons may only be clipped together if they are located in the same tile or parent tile, and if they are associated with the same elevation layer. Further details of dividing map data into hierarchical spatial tiles and clipping surfaces within tiles may be found in US20230126130 A1, "Drivable Surface Map For Autonomous Vehicle Navigation", which is incorporated herein by reference in its entirety for all purposes.

Some examples may comprise, for a first parent tile having a fifth polygon associated with a transitional layer between the first elevation layer and the second elevation layer: sub-dividing the first parent tile into a plurality of tiles, wherein a first tile includes a third portion of the fifth polygon, and a second tile includes a fourth portion of the fifth polygon; determining that elevation information associated with the third portion of the fifth polygon is associated with the first elevation layer and not the second elevation layer; and re-allocating the third portion of the fifth polygon from the transition layer to the first elevation layer. Thus, examples may dynamically re-allocate (or re-associate) surfaces to different elevation layers as tiles are divided, which may reduce the number of occupied elevation layers in various tiles, and so may reduce the size of the second map data. In some examples areas may be divided based at least in part on the presence of a drivable surface within the area. For example, areas with few or no drivable surfaces may not be sub-divided further, whereas areas with more drivable surfaces may be further sub-divided, for example generating sub-tiles which are entirely covered by a drivable surface and sub-tiles that include a boundary between a drivable surface and a non-drivable surface.

Some examples may comprise classifying the first elevation layer associated with a second tile as a drivable area. That is, the whole layer may be deemed to be a drivable area. This may be efficiently represented in the second map data without detailed elements of the layer, for example as an element of serialized data, which may be easily queried by a vehicle using the second map data. In some examples, the first elevation layer may be classified as a first drivable area, and a second elevation layer associated with the second tile may be classified as a second drivable area.

Some examples may comprise generating, based at least in part on the second map data, a data structure identifying pairs of overlapping and non-interacting traversable surfaces (e.g., a first road and an overlapping second road). The data structure may be provided to the control system of the vehicle, the control system configured to control the vehicle based at least in part on identifying, in the data structure, a first pair of traversable surfaces in an environment through which the vehicle is traversing. Thus, the techniques discussed herein may be used to generate a list of overlapping surfaces which can be used by the vehicle for example to quickly identify that it is safe to proceed under an overpass regardless of any agents traversing the overpass.

Techniques of the present disclosure may comprise determining first map data indicating a first road segment, a second road segment, and a third road segment associated with an environment; determining, based at least in part on the first map data, elevation information associated with the first road segment, the second road segment, and the third road segment; generating, from the first map data, a first polygon representing the first road segment, a second polygon representing the second road segment, and a third polygon representing the third road segment; rendering, as second map data, the first polygon, the second polygon, and the third polygon, wherein a first portion of the first polygon overlaps, in a two-dimensional representation, with a second portion of the second polygon, and a third portion of the first polygon overlaps, in the two-dimensional representation, with a fourth portion of the third polygon; associating, based at least in part on the elevation information, the first polygon and the third polygon with a first elevation layer; associating, based at least in part on the elevation information, the second polygon with a second elevation layer; generating third map data by: combining, based at least in part on the first polygon and the third polygon being associated with the first elevation layer, the third portion of the first polygon and the fourth portion of the third polygon; retaining, based at least in part on the first polygon being associated with the first elevation layer and the second polygon being associated with the second elevation layer, the first portion of the first polygon and the second portion of the second polygon; associating the first polygon and the third polygon with a first drivable area; and associating the second polygon with a second drivable area that does not interact with the first drivable area; and providing the third map data to a vehicle configured to control operations of the vehicle based at least in part on querying the third map data to identify the first drivable area, the second drivable area, and that the second drivable area does not interact with the first drivable area.

In some examples, the first road segment may be associated with a first road in the environment, and the second road segment may be associated with a second road in the environment. The second road may pass over the first road without interacting with the first road. The second road may not interact with the first road in that there is no drivable and/or traversable connection (e.g., a ramp) between the first road and the second road, for example at the area of the overlap between the roads and/or within a predetermined distance of the overlap between the roads.

Some techniques may comprise determining, in relation to map data that represents an environment, a location associated with a vehicle, wherein the map data includes indicates a first drivable area and a second drivable area, wherein the first drivable area and second drivable area overlap in a two-dimensional representation; determining, based at least in part on the location, that the vehicle is traversing the first drivable area approaching an overlap between the first drivable area and the second drivable area, and controlling the vehicle, based at least in part the map data indicating the first drivable area and the second drivable area as separate drivable areas, to continue to traverse the first drivable area. In some examples the map data may comprise spatially indexed tiles representing the first drivable area and the second drivable area. In some examples the techniques may comprise determining, based at least in part on the location and/or an orientation of the vehicle, a boundary of the first drivable area and/or second drivable area, and controlling the vehicle based at least in part on the boundary. For example, ray-casting techniques may be used to determine a drivable area boundary. Ray-casting techniques are discussed further in US20230127185, "Drivable Surface Map For Autonomous Vehicle Navigation", which is incorporated herein by reference in its entirety for all purposes.

The techniques described herein can be implemented in a number of ways. Example implementations are provided below with reference to the following figures. Example implementations are discussed in the context of autonomous vehicles; however, the methods, apparatuses, and components described herein can be applied to a variety of components (e.g., a robotic platform), and are not limited to autonomous vehicles. In one example, the techniques described herein may be used in driver-controlled vehicles. In another example, the techniques can be used in an aviation or nautical context. Additionally, the subject matter of this disclosure may provide various advantages or benefits. For instance, in some cases, the techniques described may provide safer vehicle operation, such as by improving the accuracy of map data relied on to determine trajectories and increasing the speed and efficiency with which trajectory determinations are calculated. For example, the improved map data provided herein may allow vehicle computer systems to quickly and reliably identify drivable areas, and distinguish drivable areas that overlap but do not interact.

FIG. 1 illustrates an example environment 100. Environment 100 may be an environment in which a vehicle, such as an autonomous vehicle, operates. An example of an autonomous vehicle is discussed further below in relation to FIG. 8.

The environment 100 comprises a first road 102, a second road 104, and a third road 106. The second road 104 passes over the first road 102. In this example, the second road 104 does not interact with the first road 102, at least within the illustrated portion of environment 100. For example, there are no on- or off-ramps connecting the first road 102 to the second road 104 proximal to the area where the second road 104 crosses the first road 102. The third road 106 crosses the first road 104 at junction or intersection 108.

FIG. 1 also illustrates elevation information associated with the environment 100. In this example, the elevation information is indicated by the label '0' or '1' along the edges of roads 102, 104, 106. The elevation information may be part of map data discussed in relation to FIG. 2 below but is illustrated in FIG. 1 to demonstrate its relation to the 3D environment 100. The elevation information may be sampled at various positions in the environment 100. For example, the elevation information may be sampled with regular spacing along map elements such as road segments. As in the illustrated example, the elevation information may comprise an elevation layer indicator. The indicator may indicate a vertical map layer with which a particular point is associated. For example, points labelled '0' in FIG. 1 may be associated with a layer. Points labelled '1' may be associated with a second layer. Points may be associated with the second elevation layer if they are located above another layer. Thus, for example, positions on the second road 104 as the second road 104 passes over the first road 102 may be associated with a second layer. In other examples, the elevation may comprise a respective altitude for each sampled position, or altitude range. Although illustrated as being associated with edges of the roads 102, 104, 106, in general elevation information may be associated with any point on the roads 102, 104, 106 (or more generally, drivable/traversable surfaces), a boundary associated with a traversable surface, a boundary vertex associated with a traversable surface, or a tile containing a traversable surface.

Figure 2:
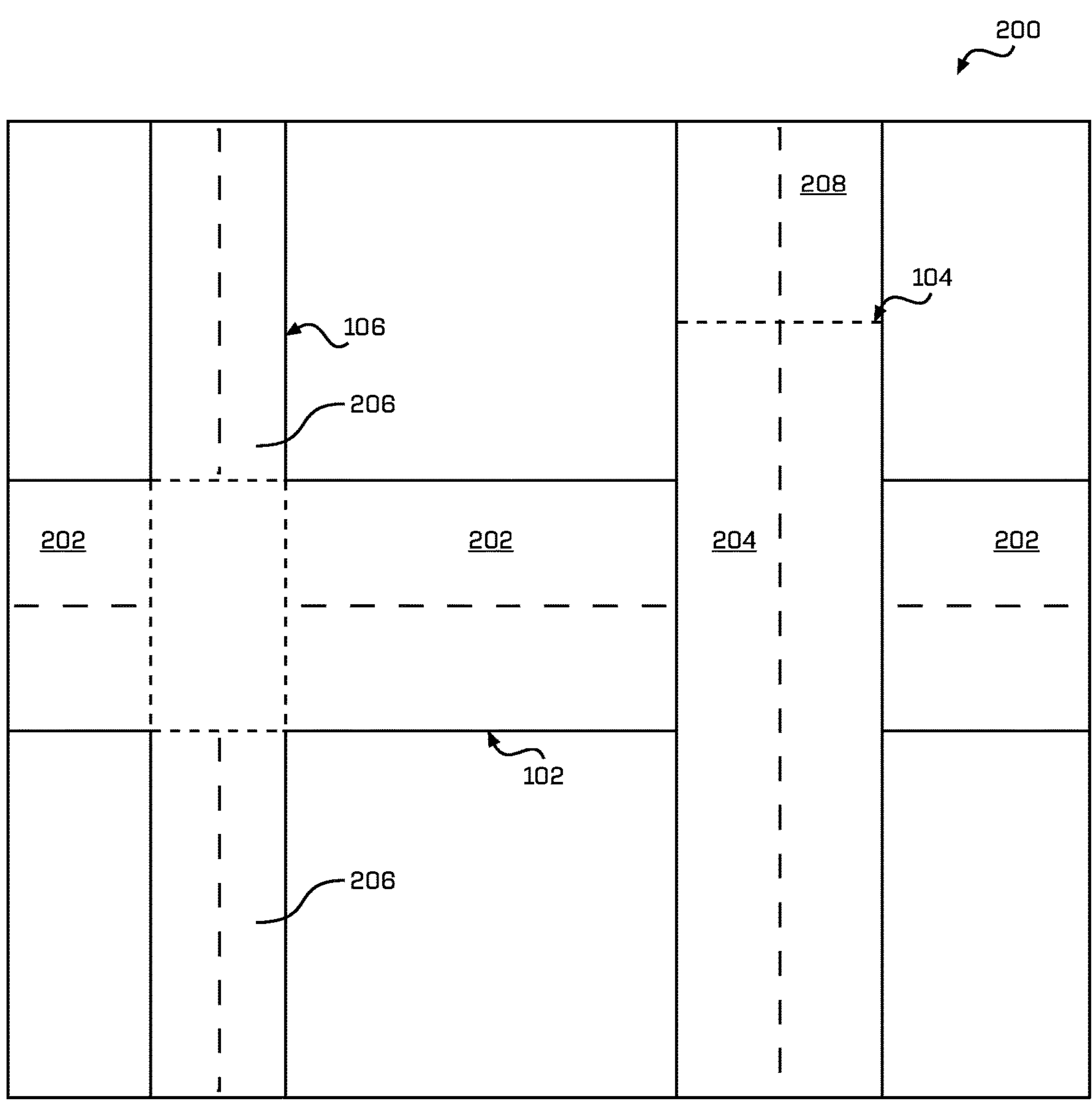
FIG. 2 illustrates two-dimensional map data representing the environment of FIG. 1.

FIG. 2 illustrates example first map data 200 representing the example environment 100. First map data 200 may be a two-dimensional representation of the environment 100, e.g., representing a birds-eye (top-down) view of the environment 100. In such a two-dimensional view, it is apparent that the second road 104 crosses the first road 102, but it is not clear that there is a vertical separation between the roads 102, 104. Techniques of the present disclosure may combine overlapping map elements, such as road segments, to derive a total drivable surface. The total drivable surface may be used by a vehicle, such as the vehicle 802 discussed below, to determine how to traverse the environment 100. If the roads 102 and 104 were merged based on the two-dimensional map data 200, a vehicle using the total drivable surface may consider that the second road 104 forms a continuous drivable surface with the first road 102, similarly to how the first road 102 and third road 106 form a continuous surface. As a result, a first vehicle may, for example, react to other vehicles or agents on the second road 104 as if they were in the path of the first vehicle, rather than on a non-interacting road.

Techniques of the present disclosure may use elevation information associated with first map data 200 to associate road segments (or corresponding polygons) with respective elevation layers, and so to determine respective combined surfaces, for example each associated with multiple road segments, for one or more elevation layers. A combined surface may be considered as, or represent, a combined drivable surface where the merged polygons forming the combined surface themselves represent drivable surfaces. Such techniques may provide a more accurate representation of the environment 100 to vehicles such as vehicle 802, which can be efficiently queried. For example, this may assist a vehicle navigating under an overpass to determine that the overpass and any agents on the overpass are not relevant to continued progress of the vehicle.

It is noted that although illustrated as overlapping roads 102, 104, in other examples any traversable surface may overlap (at least in 2D) with another traversable surface. For example, the first road 102 may be crossed by an elevated pedestrian walkway in place of the second road 102. The techniques discussed herein may, similarly to the above, identify that the pedestrian walkway is not part of a total drivable surface, guiding a vehicle to continue under the walkway even if there are pedestrians on the elevated walkway.

In general, first map data 200 may include information indicating driving lanes, solid lane lines, dash lane lines, drivable surfaces (e.g., "on-road" surfaces), other traversable but non-drivable surfaces (e.g., sidewalks—i.e., surfaces traversable by agents such as pedestrians, but not vehicles), non-drivable surfaces (e.g., "off-road" surfaces), and the like. In some examples, the map data 200 may include annotations associated with different types of drivable surfaces. For example, the map data 200 may include a parking lot annotation, an intersection annotation (e.g., indicating the intersection 108), a parking lane annotation, driving lane annotations, and the like. In some examples, annotations that represent various drivable/traversable surfaces may be represented with annotating polygons or other constructs (e.g., simple polygon shapes representing a location or area in the environment 100). In at least some examples, map data 200 may also include annotating polygons representing non-drivable portions, such as medians, that are entirely within a larger drivable-surface annotating polygon or that overlap with a drivable-surface annotating polygon.

In some examples, the first map data 200 comprise road segments. A road segment may be a map element representing a portion of a road in the environment 100. In the illustrated example, the first map data 200 comprises first road segment(s) 202 representing the first road 102, second road segment(s) 204, 208 representing portions of the second road 104, and third road segment(s) 206 representing the third road 106. The first map data 200 may include other data that represents road segments, such as control points with tangent constraints and lane widths. In some examples, control points may be generated or applied to a map during a mapping process, such as when a cartographer (or cartographer process) is creating map data to represent an environment. For example, to represent a road curvature, control points may be applied to a road. In examples, the spacing, location, and number of control points may be based on an optimized arrangement of control points that, with given control-point constraints (e.g., embedded curve tangents) most accurately represents the road.

In examples of the present disclosure, first map data 200 including the various annotations, labels, control points, and the like, may be generated by a human cartographer and/or automated. For example, in some instances, a human cartographer may provide initial map data (e.g., control points representing a road), and an alignment of the control points may be automatedly adjusted by smoothing or providing other adjustments. In another example, based on sensor data, map data may be automatedly generated, and a human cartographer may verify and/or adjust the automatedly generated map data. In either case, the first map data 200 may be based on sensor data (e.g., lidar data) recorded by one or more vehicles traversing an environment. For example, sensor data recorded by the one or more vehicles may be combined into a mesh representing the environment. Lanes and other road features may be determined from this mesh of sensor data. The human cartographer or automated process may use information in the mesh to determine heights associated with positions along road surfaces, and/or to allocate positions along road surfaces to elevation layers. For example, it may be determined whether one road passes over another based on the mesh derived from sensor data. In some examples, the mesh may comprise information relating to the altitude of map features, and/or relative heights of features (e.g., how high one road is above another road), for example as determined from the sensor data. The elevation information may be stored in association with one or more control points associated with a road segment. Techniques discussed herein may use this control point elevation as the elevation information associated with a road segment, or may determine elevation information at a different point associated with the road segment (or corresponding polygon) based at least in part on the control point elevation. For example, determining elevation information associated with a road segment may comprise interpolating between control point elevations for that road segment and/or a neighboring road segment, e.g., to determine elevation information at an edge of the road segment.

As discussed above, first map data 200 may further comprise elevation information. Elevation information may be included in first map data 200 as annotations, or other metadata associated with the first map data 200.

Figure 3:
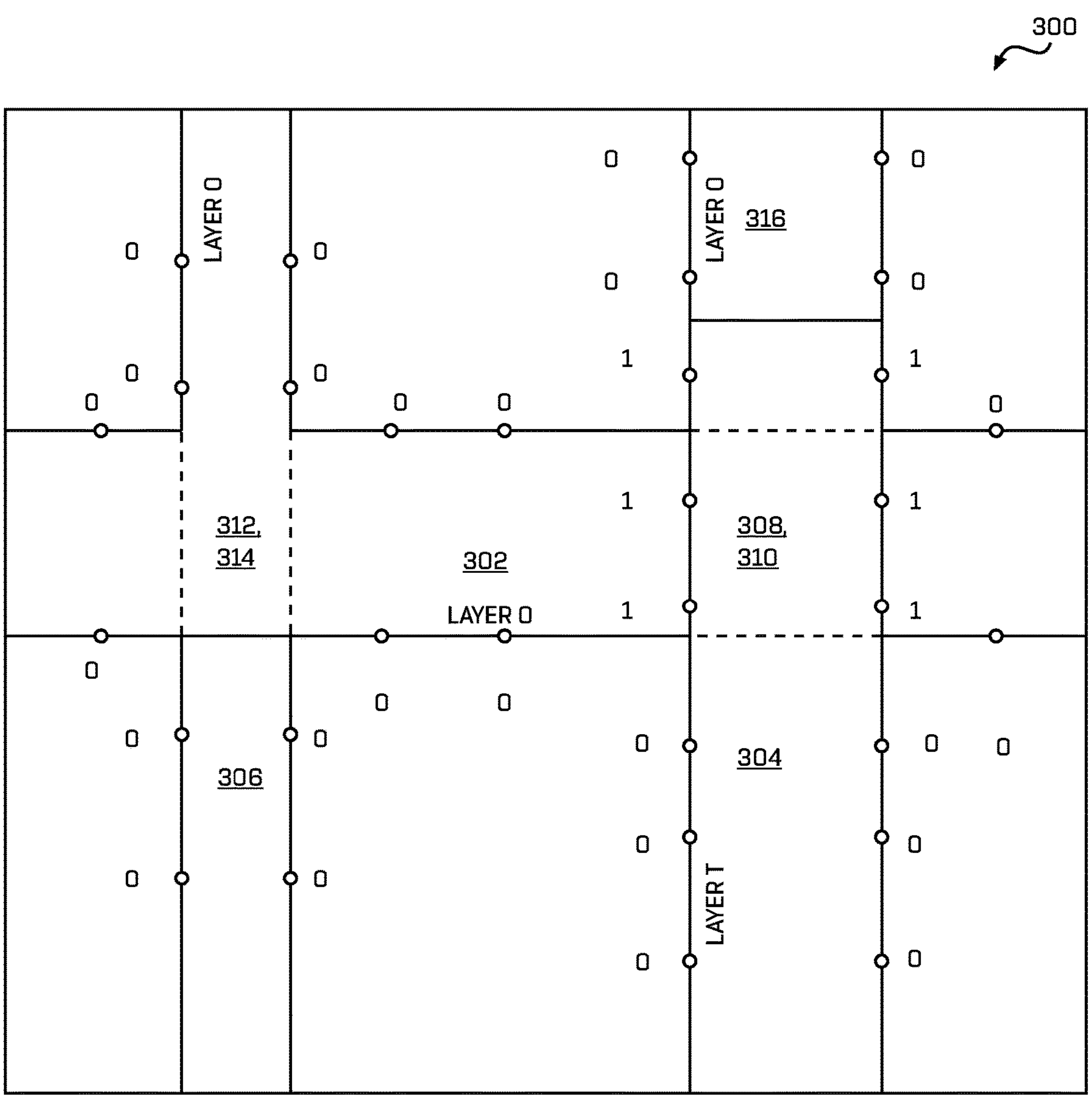
FIG. 3 illustrates further map data derived from the map data of FIG. 2 according to techniques of the present disclosure.
Figure 4:
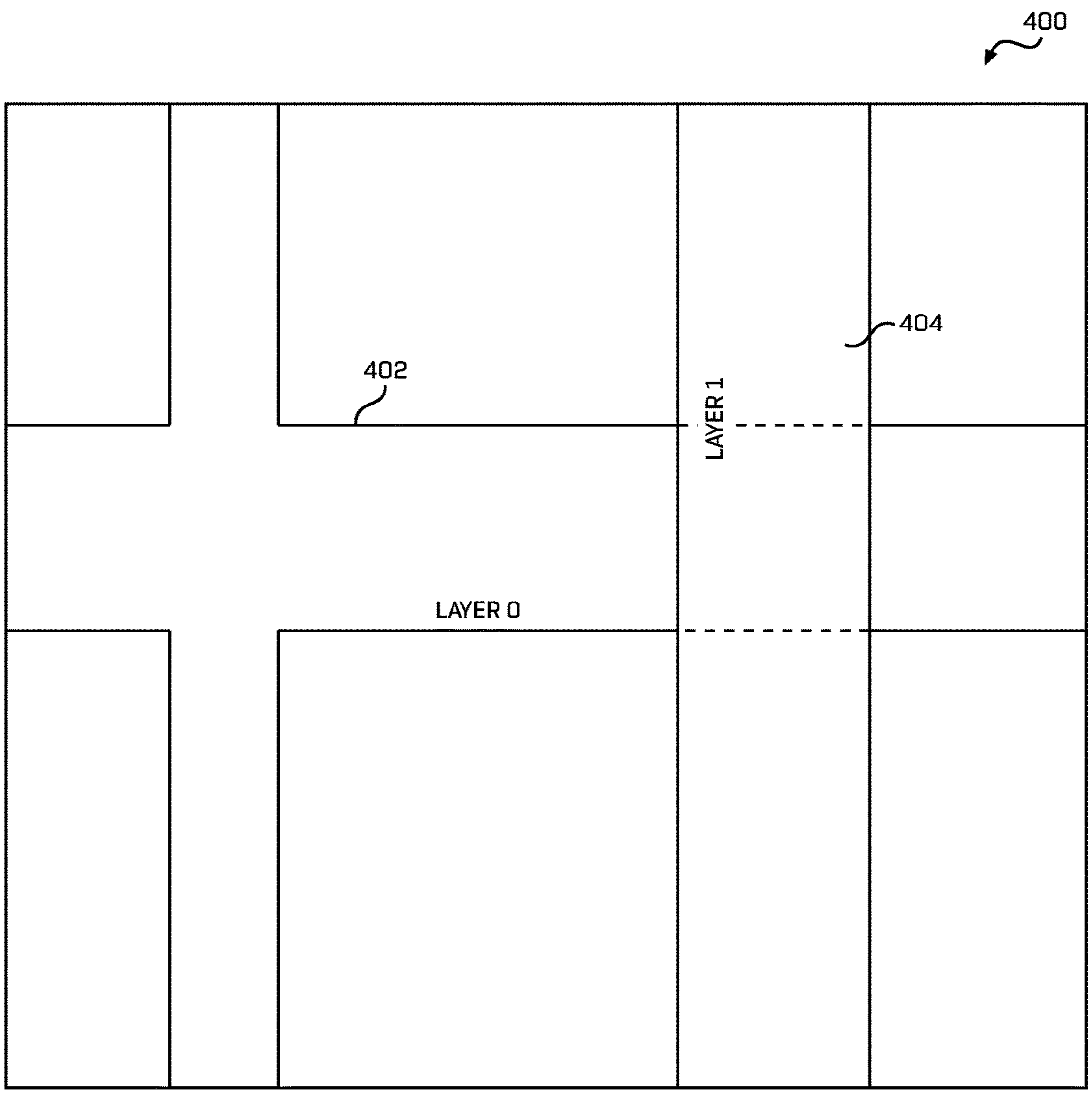
FIG. 4 illustrates further map data derived from the map data of FIG. 2 according to techniques of the present disclosure.
Figure 5:
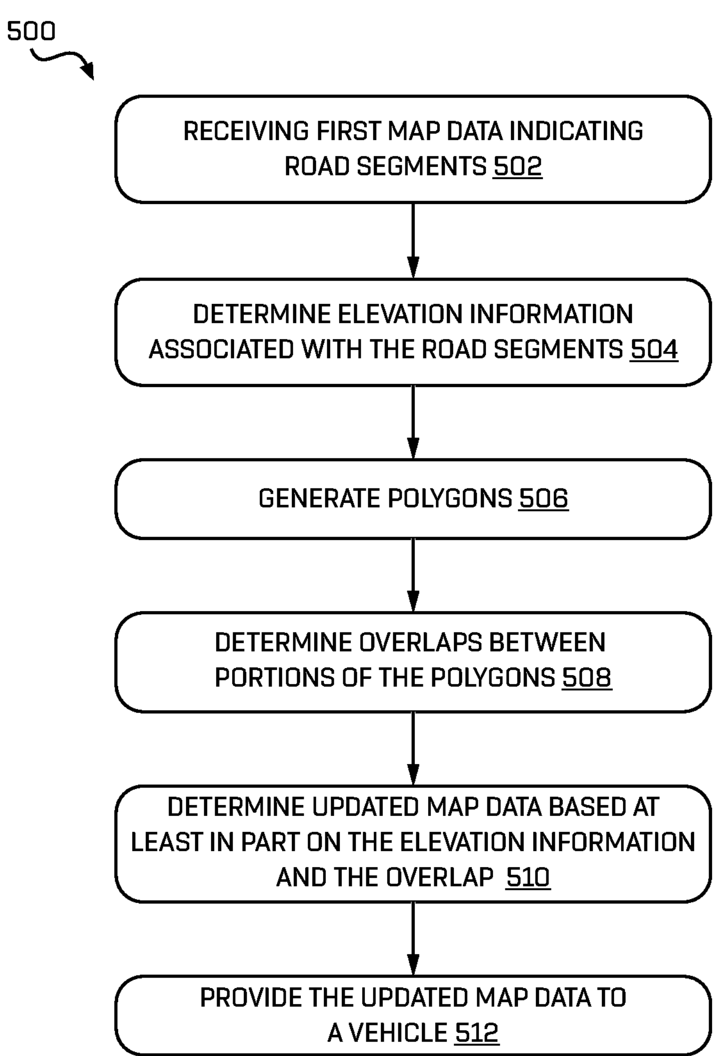
FIG. 5 is a flowchart depicting a process according to techniques of the present disclosure.

FIGS. 3 and 4 illustrate an example of processing the first map data 200 to determine combined drivable areas, for example using the process 500 illustrated in FIG. 5. The process 500 may be implemented by one or more computer systems, such as computer device(s) 832 discussed below. In some examples, the process 500 may be implemented by one or more computer systems of a vehicle, such as vehicle 802 discussed below. In general, process 500 may be implemented on a system comprising one or more processors and one or more non-transitory computer-readable media storing instructions that, when executed, perform the operations of process 500. Process 500 may be implemented as one or more transitory or non-transitory computer-readable media storing instructions executable by one or more processors, wherein the instructions, when executed, cause the one or more processors to perform the operations of process 500. Process 500 may be implemented as a computer program comprising instructions which, when executed by a computer device, cause the computer device to perform the operations of process 500.

Process 500 may comprise operation 502, comprising receiving first map data 200 indicating at least a first road segment 202, second road segment 204, and third road segment 206. The first map data 200 may represent an environment 100. The first map data 200 may be determined, for example, based at least in part on sensor measurements recorded from the environment 100, for example by one or more vehicles equipped with sensors traversing the environment 100. In other examples, determining the first map data 200 may comprise retrieving the first map data 200 from a database, such as a database stored in memory associated with the computer system performing process 500.

Process 500 may comprise operation 504. Operation 504 may comprise determining, based at least in part on the first map data 200, elevation information associated with the first road segment 202, the second road segment 204, and the third road segment 204. For example, operation 504 may comprise identifying, in the first map data 200, stored elevation information associated with one or more road segments represented in the first map data 200. As discussed above, the elevation information may be stored as annotations on the first map data, or otherwise stored in metadata associated with the first map data 200. The elevation information may comprise one or more of an elevation layer indicator or an altitude. The elevation information associated with a particular road segment may be associated with a single point in that road segment, at multiple control points associated with the road segments, or otherwise with multiple points in that road segment (e.g., sampled with a regular spacing along a boundary, as illustrated in FIG. 1). As discussed above, elevation information for a road segment may be determined by a human cartographer or automated process, for example based at least in part on a mesh representing sensor data recorded from the environment 100. For example, the appearance of the sensor data, and/or height information captured by the sensor, may be used to determine whether a given road segment in initial map data is associated with a road that passes over or under another road, and thus to determine whether to associate that road segment with a particular elevation layer.

Process 500 may comprise operations 506. Operation 506 may comprise generating, from the first map data 200, a first polygon 302 representing the first road segment 202, a second polygon 304 representing the second road segment 204, and a third polygon 306 representing the third road segment 206. In some examples operation 506 may comprise rendering, as second map data 300, the first polygon 302, the second polygon 304, and the third polygon 306. FIG. 3 illustrates an example of second map data 300, comprising polygons representing the road segments of the first map data 200 of FIG. 2.

In at least some examples, a polygon associated with a road segment may be generated by fitting a collection of Piecewise Clothoid Curves (PCC) to control point(s) associated with the road segment (e.g., control point(s) indicating a center line of the road segment), and the clothoid curves may be adaptively sampled, such as by iteratively sub-dividing the curves until they meet a user-defined curve constraint (e.g., user defined smoothness). From the sub-divided curves, outermost lane boundaries may be determined based on lane widths associated with the road segment in the map data 200, which may provide opposing sides of the polygons. Further details of generating polygons representing road segments may be found in US20230126130 A1, which is incorporated herein by reference in its entirety. Generating polygons may be considered a post-process, that is, it is performed after the first map data 200 has been generated.

In some examples, one polygon may overlap with another polygon. For example, in second map data 300, a first portion 308 of the first polygon 302 overlaps with a second portion 310 of the second polygon 304. Similarly, a third portion 312 of the first polygon 302 overlaps with a fourth portion 314 of the third polygon 306. In some examples, one polygon may overlap with another polygon in that edges of the two polygons overlap. For example, the illustrated second map data 300 includes a fourth polygon 316 representing the road segment 208, which forms part of the representation second road 102. The fourth polygon 316 abuts the second polygon 304, and so may be considered to overlap with the second polygon 304 in that an edge of the fourth polygon 316 is substantially co-located with an edge of the second polygon 304.

In other examples, polygons may be generated representing map elements other than road segments. For example, a polygon may be generated to represent junction 108, which may then overlap with respective first polygons 302 associated with the first road 102 on respective sides of junction 108, and similarly respective third polygons 306. Polygons may be generated to represent other drivable areas, such as parking areas, driveways, or parking lanes. Polygons may generally be generated to represent any traversable map element.

Returning to FIG. 5, process 500 may comprise operation 508. Operation 508 may comprise determining that the first portion 308 of the first polygon 302 overlaps (e.g., when considered in 2D) with the second portion 310 of the second polygon 304. Operation 508 may further comprise determining that the third portion 312 of the first polygon 302 overlaps with the fourth portion 314 of the third polygon 316.

Process 500 may comprise operations 510. Operation 510 may comprise determining updated (or third) map data 400 based at least in part on the elevation information and the overlaps determined in operation 508. In some examples, operation 510 may comprise associating, based at least in part on the elevation information, the first polygon 302 and the third polygon 306 with a first elevation layer ('Layer 0'). Operation 512 may comprise associating, based at least in part on the elevation information, the second polygon 304 with a second elevation layer ('Layer 1'). An elevation layer may be a stratified classification representing an elevation of the map elements represented by polygons. In some examples, as illustrated, a polygon may be allocated to (or associated with) a higher elevation layer (e.g., Layer 1 rather than Layer 0) if it crosses above polygons of a lower layer. That is, for example, even if the physical road represented by a polygon is raised above a normal road level, only portions of the road that pass over another road may be allocated to the higher elevation layer. Although described herein in terms of the first elevation layer and second elevation layer, it is to be appreciated that there can be any number of elevation layers, for example where there are more than two levels of road overlapping at a particular location.

FIG. 3 illustrates example elevation information on the second map data 300, as may be determined in operation 504 from the first map data 200. The elevation information in FIG. 3 matches the elevation information illustrated on the environment 100 in FIG. 1. In this example, all the elevation information associated with the first polygon 302 and the third polygon are '0', indicating that all parts of these polygons are associated with the lowest elevation layer. Moreover, neither polygon has a topological connection to a transition between elevation layers (discussed further below). As such, the first polygon 302 and the third polygon 306 may be associated in operation 510 with the first elevation layer (Layer 0).

Similarly, if there was a polygon whose elevation information indicated '1' at all points, that polygon may be allocated directly to the second elevation layer (Layer 1). However, in this example, the second polygon 304 has elevation points indicating '0' and elevation points indicating '1'. As such, the second polygon 304 may be allocated, at least initially, to a transition layer ('Layer T'). The transition layer may represent a layer extending between the first elevation layer and the second elevation layer. Where examples comprise additional elevation layers, transition layers may exist between any pair of, or any combination of, elevation layers.

The fourth polygon 316 in this example has elevation information that indicates '0' at all points. As such, it may initially be associated with the first elevation layer, along with the first polygon 302 and second polygon 304. However, when subsequently clipping polygons as discussed below, leaving the fourth polygon 316 associated with the first elevation layer may mean that a boundary is retained between the second polygon 304 and the fourth polygon 316, despite these polygons in fact representing the continuous drivable surface of the second road 102. Leaving such a boundary in place may affect vehicle operation when using the map data to navigate along the second road 102, for example requiring additional processing to determine that the drivable surface continues across the boundary between the second polygon 304 and the fourth polygon 304. Moreover, as in some examples, elevation information may only be sampled, e.g., at regular intervals, there may be uncertainty as to where a transition to the second elevation level begins.

Accordingly, some examples may identify a topological connection between a road segment associated with the transition layer (or second elevation layer), and one or more road segments associated with the first elevation layer. For example, it may be determined that there is a topological connection between the fourth road segment 208 and the second road segment 204. Based on this connection, the fourth road segment may be re-allocated to the transition layer or second elevation layer.

In some examples, identifying a topological connection between two road segments may comprise identifying that one road segment is a successor or predecessor to the other road segment. For example, the fourth road segment 208 in map data may be associated with identifiers identifying a predecessor or successor segment (e.g., with a direction defined by an inherent directionality of the fourth road segment). Such a connection may indicate that the road segments are part of the same continuous road. Alternatively or additionally, examples may comprise identifying the topological connection between two road segments based at least in part on those road segments being associated with a same road junction. For example, if both road segments are road segments which enter/exit the same junction, they may be considered to be topologically connected. Similarly, if both road segments are associated with the same map element or annotation in the 2D map data (e.g., a crosswalk), they may be considered topologically connected.

Thus, in some examples, a polygon such as the fourth polygon 316 may be re-allocated to the transition layer (or second elevation layer) based at least in part on a connection to one or more road elements already associated with the transition layer (or second layer).

Further, some examples may comprise re-allocating any polygons associated with the transition layer to the second elevation layer. This may comprise allocating any polygons initially allocated to the transition layer, such as the second polygon 304, to the second elevation layer. Alternatively or additionally this may comprise allocating any polygons re-allocated from the first elevation layer to the transition layer, such as the fourth polygon 316, to the second elevation layer. These re-allocated polygons may be clipped with polygons already in the second elevation layer to create continuous drivable surfaces, as discussed further below.

Returning to FIG. 5, operation 510 of process 500 may further comprise generating the updated (or third map data) 400 based at least in part on combining (or removing) overlapping portions of the polygons. For example, overlapping portion(s) of polygons may be combined if they are associated with the same elevation layer. This removing may be considered as merging or 'clipping' the polygons to remove boundaries between them. In some examples, a polygon associated with one elevation layer may not be not clipped with another polygon in another elevation layer. Such an approach may create combined, or total, drivable areas that represent the vertically separated nature of the environment 100.

FIG. 4 illustrates example updated (or third) map data 400 derived from the example second map data 300 of FIG. 3. This third map data 400 may be generated in part by removing, from the second map data, and based at least in part on the first polygon 302 and the third polygon 306 being associated with the first elevation layer, the third portion 312 of the first polygon 302 and the fourth portion 314 of the third polygon 306. In effect, this may merge road segments associated with the first road 102 and the third road 106 to derive a first combined drivable area 402, associated with the first elevation layer.

The third map data 400 in this example may further be generated by removing an overlap (e.g., a common boundary) between the second polygon 304 and the fourth polygon 316, based at least in part on the polygons 302, 316 being associated with the second elevation layer (e.g., after reallocation based on topological connections, as discussed above). This merging may generate a second combined drivable area 404, associated with the second elevation layer.

The third map data 400 may further be generated by retaining, based at least in part on the first polygon 302 being associated with the first elevation layer and the second polygon 304 being associated with the second elevation layer, the first portion 308 of the first polygon 302 and the second portion 310 of the second polygon 304. That is, boundaries between the first polygon 302 and the second polygon 304 may be retained. In other words, techniques of the present disclosure may refrain from combining polygons that are associated with different elevation layers.

In some examples, only polygons representing a same type of surface may be merged together. For example, a first type of polygon may represent drivable surfaces (e.g., road segments, etc.). A second type of polygon may represent non-drivable surfaces (e.g., sidewalks). When merging polygons, boundaries between a drivable surface polygon and a non-drivable surface polygon may be retained. This may assist in determining a boundary of a drivable area and improve safety of vehicle operation by clearly indicating to the vehicle where driving is not possible.

In at least some examples, merging of polygons (or clipping of polygon portions) may be automatically performed based on a set or series of geometric logical checks. For example, a geometric logical check may automatically determine whether a smaller drivable surface polygon is entirely within one or more other larger drivable surface polygons, and if so (e.g., proven geometrically), clip that smaller drivable surface polygon. Another example geometric logical check may geometrically determine whether overlapping polygon portions contribute to the periphery outline, and if not, then automatically remove those portions. In some examples, the clipping process may exclude certain polygons, such as those associated entirely with non-drivable surfaces, from the combined drivable area(s). Further, some examples may determine an outer boundary of the combined drivable area. In some examples, the present disclosure may perform Boolean operations on the polygons to determine portions of polygons contributing to a drivable area boundary. For instance, the Boolean operations may consider a type of polygon being processed, including whether the polygon represents a drivable surface, the type of drivable surface, or alternatively, whether the polygon represents a non-drivable surface, such as a median, and should be excluded from the drivable area. As such, examples of the present disclosure may enable creation of one larger, drivable area polygon, from which smaller, non-drivable polygons may be excluded, as opposed to needing to create multiple drivable surface polygons around the non-drivable area. Further details of merging polygons and deriving a drivable area boundary may be found in US20230126130 A1, which is incorporated herein by reference in its entirety.

Returning to FIG. 5, operation 510 may further, as discussed above in relation to FIG. 4, associating the first polygon 302 and the third polygon 306 with a first drivable area 402; and associating the second polygon 304 with a second drivable area 404 that does not interact with the first drivable area 402 (e.g., there are no roads or other traversable surfaces connecting, such as having a topological connection to, the first drivable area 402 to the second drivable area 404).

Process 500 may comprise operation 512. Operation 512 may comprise providing the third map data 400 to a vehicle (such as vehicle 802) configured to control operations of the vehicle based at least in part on querying the third map data 400 (e.g., by a localization, perception, prediction, and/or planner component of the vehicle, discussed in relation to vehicle 802 below). For example, the vehicle may query the map data 400 to identify the first drivable area 402, the second drivable area 404, and that the second drivable area 404 does not interact with the first drivable area 402. Thus, for example, the vehicle may determine that it can safely proceed to travel along the first drivable area (e.g., along the first road 102) without interacting with any vehicles, pedestrians, and/or objects on the second drivable area 404 (e.g., the second road 104).

In some examples, techniques such as process 500 may comprise generating a list or other data structure identifying pairs of overlapping, non-interacting traversable surfaces. For example, a list may be generated based at least in part on the first map data 200. Techniques may query the first map data 200 to identify each pair of overlapping roads (or road segments). The techniques may then determine whether each identified pair is a non-interacting pair of roads (or road-segments). For example, techniques may generate such a list based at least in part on determining that a pair of road segments intersect in 2D (e.g., based on the first map data 200); determining (1) that intersecting road segments are not topologically connected (for example, using the techniques discussed above); and optionally (2) that the intersecting road segments do not belong to a same junction. For example, all incoming road segments of a junction may be considered to belong to the same junction and hence be interacting with each other. Further, all incoming road segments of a junction may be considered to be interacting with all connecting road segments of the junction (e.g., road segments within a junction). If an intersecting pair of road segments meet conditions (1) and (2), they may be considered to be non-interacting, and may be included in the list of pairs of overlapping, non-interacting traversable surfaces. The determined list may be used during process 500 to determine elevation information associated with the road segments. In some examples, the list may be used to verify the elevation information determined directly from the first map data 200 and/or to verify that interacting road segments are joined into the same surface. Such techniques may reduce errors associated with inaccuracies in elevation information associated with the first map data 200, for example where that elevation information is determined by human cartographers, and/or reduce errors associated with discrepancies between the form of elevation information contained in the first map data 200 and the elevation information used in process 500 to assign polygons to elevation layers (e.g., where the first map data 200 comprises elevation information for control points at the centers of road segments, but the process 500 uses elevation information at the edge of drivable surfaces).

In some examples, such a list may be generated based on the first map data 200, without generating and merging polygons in accordance with operations 506-516 discussed above.

In some examples of the present disclosure, the generated polygons may be divided into hierarchical spatial tiles (e.g., n-tree structure such as quadtree, k-d tree, etc.), which in some examples may be serialized and indexed. In general, during the conversion, a tile structure may be applied to map data such as second map data 300 having polygons representing the various driving surfaces.

Figure 6:
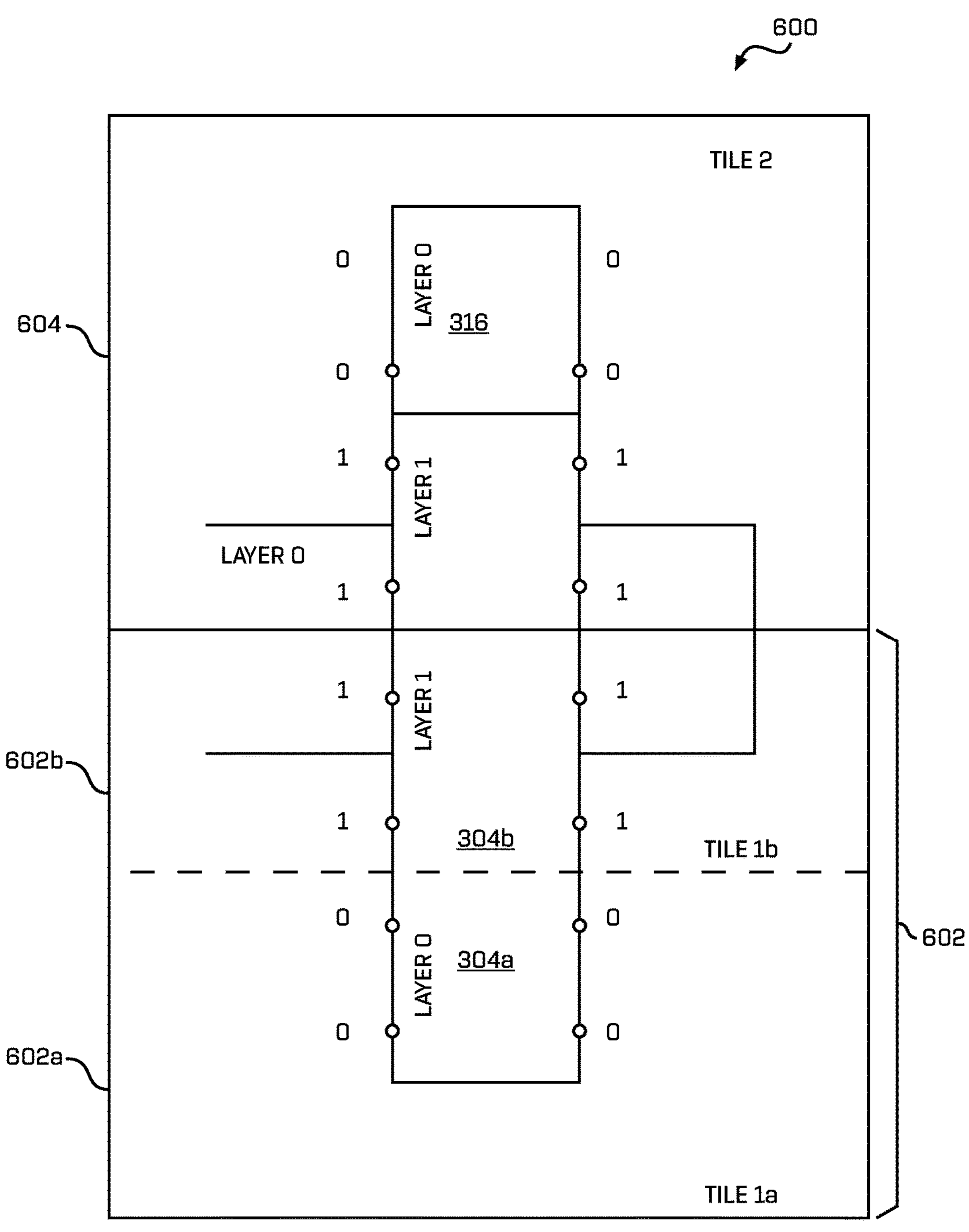
FIG. 6 illustrates division of map data into tiles according to some examples of the present disclosure.

FIG. 6 illustrates an example of dividing a portion of second map data 300 into a spatial tiles. For clarity only a part of the second map data 300 is shown in FIG. 6, but it is to be appreciated that all of the second map data 300 can be divided into such tiles. In this example, the illustrated part of second map data 300 may be divided into tiles at a first level of the hierarchy of tiles (e.g., parent tiles), here illustrated by the first tile 602 and second tile 604. The illustrated first tile 602 contains a portion of the second polygon 304. The illustrated second tile 604 contains the remaining portion of the second polygon 304, and the fourth polygon 316.

In some examples, one or more of the first level tiles may be further divided into second level tiles (e.g., sub-tiles). In the illustrated example, the first tile 602 is divided to a first sub-tile 602*a* and a second sub-tile 602*b*. In general, tiles may be sub-divided uniformly, or may be sub-divided based on traversable surfaces represented in the second map data 300. For example, areas with a higher density of drivable surfaces (e.g., road segments) may be sub-divided more than areas without drivable surfaces.

FIG. 6 also illustrates re-allocation of polygons to different elevation layers based on the division of the second map data 300 into tiles 601, 602 and sub-tiles 602*a*, 602*b*. In the illustrated example, the first tile 602 contains a portion of second polygon 304 that is associated with elevation layer indicators '0' and '1'. As discussed above, this portion may in some examples be allocated to a transition layer, for example in this case a transition layer specific to the first tile 602. However, when first tile 602 is divided further into sub-tiles 604*a*, 604*b*, the second polygon 604 may be split further. In the illustrated example, a portion 304*a* of the second polygon 304 is located in the first sub-tile 602*a*. A portion 304*b* of the second polygon 304 is located in the second sub-tile 602*b*. The elevation layer indicators associated with the portion 304*a* are all '0'. The elevation layer indicators associated with the portion 304*b* are all '1'. Thus, portion 304*a* may be allocated to the first elevation layer rather than the transition layer. Portion 304*b* may be allocated to the second elevation layer rather than the transition layer. Such an approach may simplify processing of polygons, reducing the number of polygons associated with the transition layer.

In some examples, techniques such as process 500 may merge polygons or portions thereof only if they are within the same tile, or within the same sub-tile (and within the same elevation layer, as discussed above). Tiles or sub-tiles may then be classified as being entirely drivable areas, as containing a boundary between a drivable and non-drivable area, or as being entirely non-drivable. In examples of the present disclosure, different elevation layers of a tile may be separately classified, enabling generating of distinct drivable areas separated in elevation within the third map data 400. Dividing the second map data 300 into tiles, and classifying tiles, may allow the third map data to be stored efficiently, for example as serialized map data or other in-memory searchable data. In at least some examples of the present disclosure, tiles (e.g., data associated with the tiles) may be serialized and stored in a contiguous memory space. In some examples, map data such as third map data 400 may be serialized for deployment on a vehicle, and after being loaded on the vehicle, is deserialized as an in-memory data structure for use by the vehicle (e.g., by systems of the vehicle). In accordance with examples, the memory may store data associated with the tiles. For example, tiles that do not include a drivable surface boundary (e.g., tiles classified as either drivable or non-drivable) may be represented in the spatial index by tile identifiers that indicate whether the tile is associated with a non-drivable surface or a drivable surface. In addition, memory associated with any of the tiles containing a drivable boundary may store drivable-surface boundary geometries (e.g., the geometry of the boundary as it passes through the tile) and the type of surface boundary. In addition, the memory may store links between a tile and adjacent nodes, including adjacent sub-tiles falling under different parent tiles.

In some examples, elevation information may be determined for one or more corners of a tile or sub-tile when dividing the second map data 300 into a hierarchy of tiles. For example, elevation information may be determined based at least in part on the first map data 200. In some examples, tile corner elevation may be determined based at least in part on elevation information associated with a surface (e.g., road segment) contained in that tile. In some examples, tile corner elevation for a given corner may be determined based at least in part on elevation information associated with a surface contained in a different tile, for example where that surface (or part of it) is closer to the given corner than any surfaces in that corner's own tile. In some examples, tile corner elevation information may be determined based at least in part on elevation information associated with one or boundary vertices contained within the tile, for example based at least in part on interpolating values from a nearest vertex to the tile corner. In some examples, certain tiles, such as non-drivable tiles, may not have elevation information stored associated with tile corners. In some examples, a vehicle receiving the updated (third) map data may query the map data to determine a current elevation of the vehicle, given the vehicle's position. In some such examples, in response to such a query it may first be determined which tile or sub-tile corresponds with the vehicle's position, and then the elevation information of one or more corners of that tile may be reported as the vehicle's elevation. Such an approach may provide an efficient process for determining elevation information as a vehicle traverses an environment, for example without having to interpolate elevation information from a drivable surface boundary in real time.

Further details on dividing map data into a hierarchy of tiles, classifying tiles based on whether they contain a drivable surface or boundary, and converting map data into serialized map data, and querying such map data by a vehicle is provided in US20230127185 A1, which is incorporated herein by reference in its entirety for all purposes.

Figure 7:
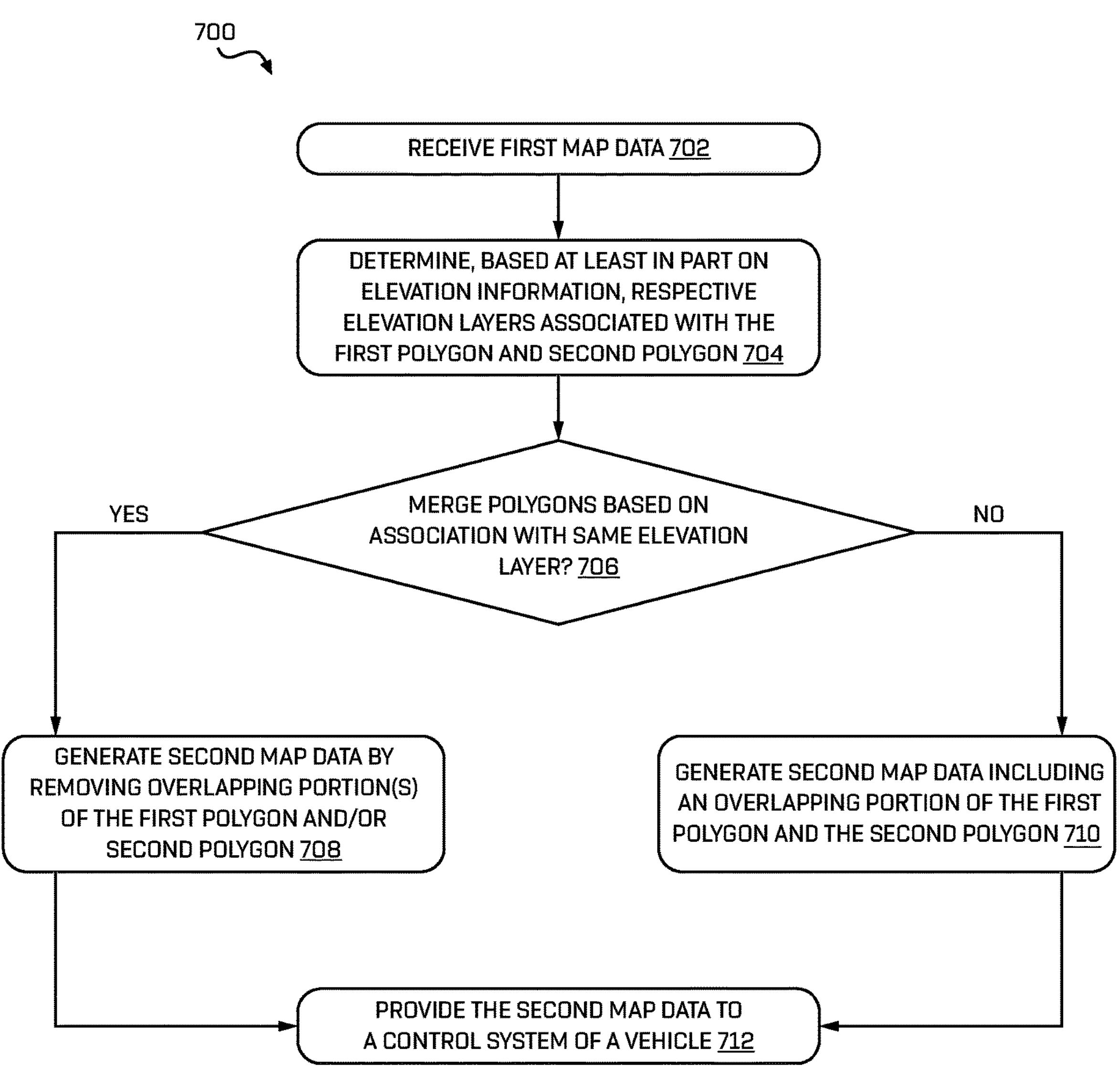
FIG. 7 is a flowchart depicting a further process according to techniques of the present disclosure.

FIG. 7 illustrates a further example of a process 700 according to the present disclosure. The process 700 may be implemented by one or more computer systems, such as computer device(s) 832 discussed below. In some examples, the process 700 may be implemented by one or more computer systems of a vehicle, such as vehicle 802 discussed below. In general, process 700 may be implemented on a system comprising one or more processors and one or more non-transitory computer-readable media storing instructions that, when executed, perform the operations of process 700. Process 700 may be implemented as one or more transitory or non-transitory computer-readable media storing instructions executable by one or more processors, wherein the instructions, when executed, cause the one or more processors to perform the operations of process 700. Process 700 may be implemented as a computer program comprising instructions which, when executed by a computer device, cause the computer device to perform the operations of process 700.

Process 700 may comprise operation 702, comprising receiving first map data associated with an environment. In some examples the first map data may comprise a first polygon representing a first traversable surface and a second polygon representing a second traversable surface, wherein the first polygon includes a first portion that overlaps with a second portion of the second polygon. In other examples operation 702 may comprise determining the first polygon and the second polygon, including the overlapping portions, based at least in part on the first map data. The first traversable surface may in some examples be a drivable surface, such as a road or one or more road segments. The second drivable surface may also be a drivable surface, or may be a surface that is traversable by non-motorized agents, such as pedestrians or cyclists. The first map data discussed in relation to process 700 may be the second map data 300 discussed in relation to process 500, and may be determined similarly to the second map data 300 discussed above.

Process 700 may comprise operation 704, comprising determining, based at least in part on elevation information associated with the first traversable surface and the second traversable surface, respective elevation layers associated with the first polygon and the second polygon. Operation 704 may comprise the determinations discussed above in relation to operation 510.

Process 700 may comprise operation 706 comprising determining whether to merge the first polygon and the second polygon based on whether the first polygon is associated with a same elevation layer as the second polygon.

Process 700 may comprise determining, based at least in part on determining whether to merge the first and second polygons, and updated map. For example, it may be determined to merge the first and second polygons based on the first and second polygons being associated with the same elevation layer as the second polygon, in which case process 700 may comprise operation 708. Operation 708 may comprise generating the updated data by removing, from the first map data, the first portion of the first polygon (e.g., by combining the first portion and the second portion). On the other hand, if it is determined to not merge the first and second polygon based on first polygon not being associated with the same elevation layer as the second polygon, process 700 may comprise operation 710, comprising generating the updated map data from the first map data, the second map data including the first portion of the first polygon. Generating updated map data in process 700, and combining/removing overlapping portions of polygons, may comprise the determinations and operations discussed above in relation to generating third map data 400 in process 500.

In some examples, process 700 may comprise operation 712. Operation 712 may comprise providing the second map data to a control system of a vehicle, the control system configured to control operation of the vehicle based at least in part on querying the second map data. Operation 712 may be similar to operation 512 discussed above.

Figure 8:
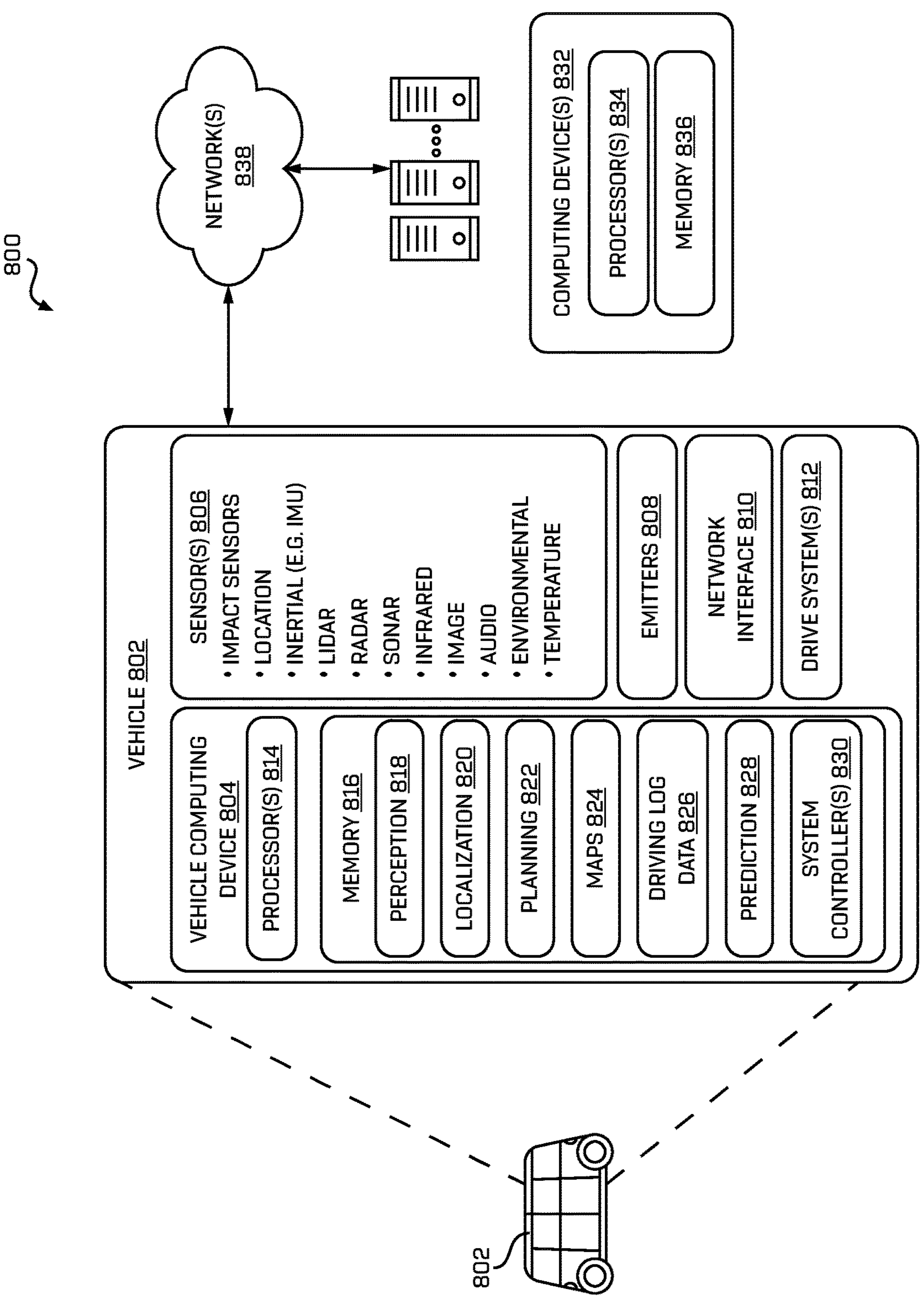
FIG. 8 is a block diagram illustrating an example vehicle system according to the present disclosure.

FIG. 8 illustrates a block diagram of an example system 800 that implements the techniques discussed herein. FIG. 8 may represent vehicle system 108 and computing device(s) 128 of FIG. 1. In some instances, the example system 800 may include a vehicle 802, which may represent the vehicle 102 in FIG. 1. In some instances, the vehicle 802 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 802 may be a fully or partially autonomous vehicle having any other level or classification. Moreover, in some instances, the techniques described herein may be usable by non-autonomous vehicles as well.

The vehicle 802 may include a vehicle computing device(s) 804, sensor(s) 806, emitter(s) 808, network interface(s) 810, and/or drive system(s) 812. The system 800 may additionally or alternatively comprise computing device(s) 832.

In some instances, the sensor(s) 806 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 806 may include multiple instances of each of these or other types of sensors. For instance, the radar sensors may include individual radar sensors located at the corners, front, back, sides, and/or top of the vehicle 802. As another example, the cameras may include multiple cameras disposed at various locations about the exterior and/or interior of the vehicle 802. The sensor(s) 806 may provide input to the vehicle computing device(s) 804 and/or to computing device(s) 832.

The vehicle 802 may also include emitter(s) 808 for emitting light and/or sound, as described above. The emitter(s) 808 may include interior audio and visual emitter(s) to communicate with passengers of the vehicle 802. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 808 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 802 may also include network interface(s) 810 that enable communication between the vehicle 802 and one or more other local or remote computing device(s). The network interface(s) 810 may facilitate communication with other local computing device(s) on the vehicle 802 and/or the drive component(s) 812. The network interface(s) 810 may additionally or alternatively allow the vehicle to communicate with other nearby computing device(s) (e.g., other nearby vehicles, traffic signals, etc.). The network interface(s) 810 may additionally or alternatively enable the vehicle 802 to communicate with computing device(s) 832 over a network 838. In some examples, computing device(s) 832 may comprise one or more nodes of a distributed computing system (e.g., a cloud computing architecture).

The vehicle 802 may include one or more drive components 812. In some instances, the vehicle 802 may have a single drive component 812. In some instances, the drive component(s) 812 may include one or more sensors to detect conditions of the drive component(s) 812 and/or the surroundings of the vehicle 802. By way of example and not limitation, the sensor(s) of the drive component(s) 812 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 812. In some cases, the sensor(s) on the drive component(s) 812 may overlap or supplement corresponding systems of the vehicle 802 (e.g., sensor(s) 806).

The drive component(s) 812 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 812 may include a drive component controller which may receive and pre-process data from the sensor(s) and to control operation of the various vehicle systems. In some instances, the drive component controller may include one or more processors and memory communicatively coupled with the one or more processors. The memory may store one or more components to perform various functionalities of the drive component(s) 812. Furthermore, the drive component(s) 812 may also include one or more communication connection(s) that enable communication by the respective drive component with one or more other local or remote computing device(s).

The vehicle computing device(s) 804 may include processor(s) 814 and memory 816 communicatively coupled with the one or more processors 814. Computing device(s) 832 may also include processor(s) 834, and/or memory 836. The processor(s) 814 and/or 834 may be any suitable processor capable of executing instructions to process data and perform operations as described herein. By way of example and not limitation, the processor(s) 814 and/or 834 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 816 and/or 836 may be examples of non-transitory computer-readable media. The memory 816 and/or 836 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), non-volatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 816 and/or memory 836 may store a perception component 818, localization component 820, planning component 822, map(s) 824, driving log data 826, prediction component 828, and/or system controller(s) 830—zero or more portions of any of which may be hardware, such as GPU(s), CPU(s), and/or other processing units.

The perception component 818 may detect object(s) in in an environment surrounding the vehicle 802 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 818 is referred to as perception data. The perception component 818 may be configured to associate a bounding region (or other indication) with an identified object. The perception component 818 may be configured to associate a confidence score associated with a classification of the identified object with an identified object. In some examples, objects, when rendered via a display, can be colored based on their perceived class. The object classifications determined by the perception component 818 may distinguish between different object types such as, for example, a passenger vehicle, a pedestrian, a bicyclist, motorist, a delivery truck, a semi-truck, traffic signage, and/or the like.

In at least one example, the localization component 820 may include hardware and/or software to receive data from the sensor(s) 806 to determine a position, velocity, and/or orientation of the vehicle 802 (e.g., one or more of an x-, y-, z-position, roll, pitch, or yaw). For example, the localization component 820 may include and/or request/receive map(s) 824 of an environment and can continuously determine a location, velocity, and/or orientation of the autonomous vehicle 802 within the map(s) 824. In some instances, the localization component 820 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 820 may provide data to various components of the vehicle 802 to determine an initial position of an autonomous vehicle for generating a trajectory and/or for generating map data, as discussed herein. In some examples, localization component 820 may provide, to the perception component 818, a location and/or orientation of the vehicle 802 relative to the environment and/or sensor data associated therewith.

The planning component 822 may receive a location and/or orientation of the vehicle 802 from the localization component 820 and/or perception data from the perception component 818 and may determine instructions for controlling operation of the vehicle 802 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 830 and/or drive component(s) 812 may parse/cause to be carried out, second instructions for the emitter(s) 808 may be formatted according to a second format associated therewith).

The driving log data 826 may comprise sensor data, perception data, and/or scenario labels collected/determined by the vehicle 802 (e.g., by the perception component 818), as well as any other message generated and or sent by the vehicle 802 during operation including, but not limited to, control messages, error messages, etc. In some examples, the vehicle 802 may transmit the driving log data 826 to the computing device(s) 832. The computing device(s) 832 may identify one or more scenarios based at least in part on the log data, which may also comprise defining a scenario, wherein the scenarios are used to generate a playback simulation. For example, the computing device(s) 832 may determine an environmental layout, a number, type, and a configuration of object(s) in the environment and/or associate this definition with one or more portions of log data associated with that scenario. In some examples, the driving log data 826 may comprise (historical) perception data that was generated on the vehicle 802 during operation of the vehicle.

The prediction component 828 may generate one or more probability maps representing prediction probabilities of possible locations of one or more objects in an environment. For example, the prediction component 828 may generate one or more probability maps for vehicles, pedestrians, animals, and the like within a threshold distance from the vehicle 802. In some examples, the prediction component 828 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planner component 822 may be communicatively coupled to the prediction component 828 to generate predicted trajectories of objects in an environment. For example, the prediction component 828 may generate one or more predicted trajectories for objects within a threshold distance from the vehicle 802. In some examples, the prediction component 828 may measure a trace of an object and generate a trajectory for the object based on observed and predicted behavior. Although prediction component 828 is shown on a vehicle 802 in this example, the prediction component 828 may also be provided elsewhere, such as in a remote computing device. In some examples, a prediction component may be provided at both a vehicle and a remote computing device. These components may be configured to operate according to the same or a similar algorithm.

The memory 816 and/or 836 may additionally or alternatively store a mapping system, a planning system, a ride management system, etc. Although perception component 818 and/or planning component 822 are illustrated as being stored in memory 816, perception component 818 and/or planning component 822 may include processor-executable instructions, machine-learned model(s) (e.g., a neural network), and/or hardware.

As described herein, the localization component 820, the perception component 818, the planning component 822, the simulation system 838, and/or other components of the system 800 may comprise one or more ML models. For example, the localization component 820, the perception component 818, the planning component 822, and/or the simulation system 838 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 820 may additionally or alternatively store one or more system controller(s) 830, which may be configured to control steering, propulsion, braking, safety, emitters, communication, and other systems of the vehicle 802. These system controller(s) 830 may communicate with and/or control corresponding systems of the drive component(s) 812 and/or other components of the vehicle 802.

It should be noted that while FIG. 8 is illustrated as a distributed system, in alternative examples, components of the vehicle 802 may be associated with the computing device(s) 832 and/or components of the computing device(s) 832 may be associated with the vehicle 802. That is, the vehicle 802 may perform one or more of the functions associated with the computing device(s) 832, and vice versa.

EXAMPLE CLAUSES

A: A system comprising one or more processors; and one or more non-transitory computer-readable media storing instructions that, when executed, cause the system to perform operations comprising: receiving first map data indicating a first road segment, a second road segment, and a third road segment associated with an environment; determining, based at least in part on the first map data, elevation information associated with the first road segment, the second road segment, and the third road segment; generating, from the first map data, a first polygon representing the first road segment, a second polygon representing the second road segment, and a third polygon representing the third road segment; determining a first overlap between a first portion of the first polygon and a second portion of the second polygon, and a second overlap between a third portion of the first polygon and a fourth portion of the third polygon; determining, based at least in part on the elevation information and the first and second overlaps, an updated map based at least in part on: combining a first portion of the first polygon with a second portion of the second polygon; and refraining from combining a second portion of the first polygon with a third portion of the third polygon; and providing the updated map data to a vehicle configured to control operations of the vehicle based at least in part on querying the third map data.

B: The system of clause A, wherein the first map data indicates a fourth road segment, and wherein the second polygon is associated with a transition between a first elevation layer and a second elevation layer, and wherein the operations further comprise: determining, based at least in part on the elevation information, that the fourth road segment is associated with the first elevation layer; identifying an association between the fourth road segment and the second road segment; and associating, based at least in part on the connection, a fourth polygon representing the fourth road segment with the second elevation layer, and wherein determining the updated map is further based at least in part on the fourth polygon and the second polygon being associated with the second elevation layer.

C: The system of clause A or clause B, wherein the first road segment is associated with a first road in the environment, and the second road segment is associated with a second road in the environment, wherein the second road passes over the first road without interacting with the first road.

D: The system of any of clauses A to C, wherein: the updated map data is divided into hierarchical spatial tiles, a first portion of the third polygon associated with a first tile and a second portion of the third polygon associated with a second tile.

E: A method comprising, receiving map data associated with an environment; determining, based at least in part on the map data, a first polygon representing a first traversable surface and a second polygon representing a second traversable surface, wherein the first polygon includes a first portion that overlaps with a second portion of the second polygon; determining, based at least in part on elevation information associated with the first traversable surface and the second traversable surface, respective elevation layers associated with the first polygon and the second polygon; determining whether to merge the first polygon and the second polygon based at least in part on whether the first polygon is associated with a same elevation layer as the second polygon; and determining, based at least in part on determining whether to merge the first and second polygons, an updated map.

F: The method of clause E, wherein the map data comprises a third polygon representing a third traversable surface, the method comprising: determining, based at least in part on elevation information associated with the third traversable surface, that the third polygon is associated with a transition layer between a first elevation layer and a second elevation layer, wherein the second polygon is associated with the second elevation layer; associating, based at least in part on the third polygon being associated with the transition layer, the third polygon to the second elevation layer; and merging a portion of the third polygon with an overlapping portion of the second polygon.

G: The method of clause F, wherein the map data comprises a fourth polygon representing a fourth traversable surface, the method comprising: determining, based at least in part on elevation information associated with the fourth traversable surface, that the fourth polygon is associated with the first elevation layer; identifying, based at least in part on the map data, a topological connection between the fourth traversable surface and the third traversable surface; and based at least in part on the topological connection between the fourth traversable surface and the third traversable surface, associating the fourth polygon with the second elevation layer.

H: The method of clause G, comprising identifying the topological connection between the fourth traversable surface and the third traversable surface based at least in part on the fourth traversable surface being a successor or predecessor to the third traversable surface in the map data.

I: The method of clause G or H, comprising identifying the topological connection between the fourth traversable surface and the third traversable surface based at least in part on the fourth traversable surface and the third traversable surface being associated with a same road junction.

J: The method of any of clauses E to I, further comprising dividing the map data into hierarchical spatial tiles, comprising: dividing the map data into a plurality of parent tiles; and dividing at least one parent tile into a plurality of tiles.

K: The method of clause J, further comprising: determining a first portion of an additional polygon associated with a transition layer lies within a first tile and a second portion of the additional polygon lies within a second tile of the plurality of tiles; and designating the first portion of the additional polygon from the transition layer to the first elevation layer.

L: The method of any of clauses E to K, comprising providing the updated map to a control system of a vehicle, the control system configured to control operation of the vehicle based at least in part on the updated map.

M: The method of any of clauses E to L, wherein the elevation information comprises an altitude or elevation layer indicator associated with one or more of: the first traversable surface, a boundary associated with the first traversable surface, a boundary vertex associated with the first traversable surface, or a tile containing the first traversable surface.

N: One or more non-transitory computer-readable media storing instructions executable by one or more processors, wherein the instructions, when executed, cause the one or more processors to perform operations comprising: receiving map data associated with an environment; determining, based at least in part on the map data, a first polygon representing a first traversable surface and a second polygon representing a second traversable surface, wherein the first polygon includes a first portion that overlaps with a second portion of the second polygon; determining, based at least in part on elevation information associated with the first traversable surface and the second traversable surface, respective elevation layers associated with the first polygon and the second polygon; determining whether to merge the first polygon and the second polygon based at least in part on whether the first polygon is associated with a same elevation layer as the second polygon; and determining, based at least in part on determining whether to merge the first and second polygons, an updated map.

O: The one or more non-transitory computer-readable media of clause N, wherein the updated map includes boundary information associated with at least one of the first polygon or the second polygon, the boundary information indicating an edge of a drivable area.

P: The one or more non-transitory computer-readable media of clause N or clause O, the operations comprising: converting the updated map to serialized map data, the serialized map data comprising identifiers representing drivable areas; and providing the serialized map data to a vehicle, the vehicle configured to deserialize the serialized map data for use in controlling the vehicle.

Q: The one or more non-transitory computer-readable media of any of clauses N to P, the operations comprising: generating, based at least in part on the map data, a data structure identifying pairs of overlapping, non-interacting traversable surfaces; and determining the updated map based at least in part on the data structure.

R: The one or more non-transitory computer-readable media of any of clauses N to Q, wherein the first traversable surface or second traversable surface comprise one or more of: a road segment, a parking lot, a parking spot, a parking lane, a driveway, a bike lane, a junction, a sidewalk, a pedestrian overpass, or a pedestrian underpass.

S: The one or more non-transitory computer-readable media of any of clauses N to R, wherein determining the first polygon comprises: determining a longitudinal dimension of the first polygon based at least in part on control points associated with the first traversable surface; and determining a lateral dimension of the first polygon based at least in part a width associated with the first traversable surface.

T: The one or more non-transitory computer-readable media of any of clauses N to S, the operations comprising: dividing the map data into a hierarchy of spatial tiles.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising, one or more processors; and one or more non-transitory computer-readable media storing instructions that, when executed, cause the system to perform operations comprising:

receiving first map data indicating a first road segment, a second road segment, and a third road segment associated with an environment;

determining, based at least in part on the first map data, elevation information associated with the first road segment, the second road segment, and the third road segment;

generating, from the first map data, a first polygon representing the first road segment, a second polygon representing the second road segment, and a third polygon representing the third road segment;

determining a first overlap between a first portion of the first polygon and a second portion of the second polygon, and a second overlap between a third portion of the first polygon and a fourth portion of the third polygon;

determining, based at least in part on the elevation information and the first and second overlaps, an updated map based at least in part on:

combining a first portion of the first polygon with a second portion of the second polygon; and refraining from combining the third portion of the first polygon with the fourth portion of the third polygon; and providing the updated map to a vehicle, wherein the updated map causes the vehicle to traverse the first road segment and the second road segment independently of the presence of the third road segment.

2. The system of claim 1, wherein the first map data indicates a fourth road segment, and wherein the second polygon is associated with a transition between a first elevation layer and a second elevation layer, and wherein the operations further comprise:

determining, based at least in part on the elevation information, that the fourth road segment is associated with the first elevation layer;

identifying an association between the fourth road segment and the second road segment; and associating, based at least in part on the association, a fourth polygon representing the fourth road segment with the second elevation layer, and wherein determining the updated map is further based at least in part on the fourth polygon and the second polygon being associated with the second elevation layer.

3. The system of claim 1, wherein the first road segment is associated with a first road in the environment, and the second road segment is associated with a second road in the environment, wherein the second road passes over the first road without interacting with the first road.

4. The system of claim 1, wherein:

the updated map is divided into hierarchical spatial tiles, a first portion of the third polygon associated with a first tile and a second portion of the third polygon associated with a second tile.

5. A method comprising, receiving map data associated with an environment;

determining, based at least in part on the map data, a first polygon representing a first traversable surface and a second polygon representing a second traversable surface, wherein the first polygon includes a first portion that overlaps with a second portion of the second polygon;

determining, based at least in part on elevation information associated with the first traversable surface and the second traversable surface, respective elevation layers associated with the first polygon and the second polygon;

determining whether to combine, or to refrain from combining, the first polygon and the second polygon based at least in part on whether the first polygon is associated with a same elevation layer as the second polygon;

determining, based at least in part on determining whether to combine or to refrain from combining the first and second polygons, an updated map; and providing the updated map to a vehicle, wherein the updated map causes the vehicle to traverse the first traversable surface based on, or independently of, the second traversable surface based at least in part on the combining or refraining from combining the first and second polygons.

6. The method of claim 5, wherein the map data comprises a third polygon representing a third traversable surface, the method comprising:

determining, based at least in part on elevation information associated with the third traversable surface, that the third polygon is associated with a transition layer between a first elevation layer and a second elevation layer, wherein the second polygon is associated with the second elevation layer;

associating, based at least in part on the third polygon being associated with the transition layer, the third polygon to the second elevation layer; and combining a portion of the third polygon with an overlapping portion of the second polygon.

7. The method of claim 6, wherein the map data comprises a fourth polygon representing a fourth traversable surface, the method comprising:

determining, based at least in part on elevation information associated with the fourth traversable surface, that the fourth polygon is associated with the first elevation layer;

identifying, based at least in part on the map data, a topological connection between the fourth traversable surface and the third traversable surface; and based at least in part on the topological connection between the fourth traversable surface and the third traversable surface, associating the fourth polygon with the second elevation layer.

8. The method of claim 7, comprising identifying the topological connection between the fourth traversable surface and the third traversable surface based at least in part on the fourth traversable surface being a successor or predecessor to the third traversable surface in the map data.

9. The method of claim 7, comprising identifying the topological connection between the fourth traversable surface and the third traversable surface based at least in part on the fourth traversable surface and the third traversable surface being associated with a same road junction.

10. The method of claim 5, further comprising dividing the map data into hierarchical spatial tiles, comprising:

dividing the map data into a plurality of parent tiles; and dividing at least one parent tile into a plurality of tiles.

11. The method of claim 10, further comprising:

determining a first portion of an additional polygon associated with a transition layer lies within a first tile and a second portion of the additional polygon lies within a second tile of the plurality of tiles; and designating the first portion of the additional polygon from the transition layer to a first elevation layer.

12. The method of claim 5, comprising providing the updated map to a control system of a vehicle, the control system configured to control operation of the vehicle based at least in part on the updated map.

13. The method of claim 5, wherein the elevation information comprises an altitude or elevation layer indicator associated with one or more of: the first traversable surface, a boundary associated with the first traversable surface, a boundary vertex associated with the first traversable surface, or a tile containing the first traversable surface.

14. One or more non-transitory computer-readable media storing instructions executable by one or more processors, wherein the instructions, when executed, cause the one or more processors to perform operations comprising:

receiving map data associated with an environment;

determining, based at least in part on the map data, a first polygon representing a first traversable surface and a second polygon representing a second traversable surface, wherein the first polygon includes a first portion that overlaps with a second portion of the second polygon;

determining, based at least in part on elevation information associated with the first traversable surface and the second traversable surface, respective elevation layers associated with the first polygon and the second polygon;

determining whether to combine, or to refrain from combining, the first polygon and the second polygon based at least in part on whether the first polygon is associated with a same elevation layer as the second polygon;

determining, based at least in part on determining whether to combine or to refrain from combining the first and second polygons, an updated map; and providing the updated map to a vehicle, wherein the updated map causes the vehicle to traverse the first traversable surface based on, or independently of, the second traversable surface based at least in part on the combining or refraining from combining the first and second polygons.

15. The one or more non-transitory computer-readable media of claim 14, wherein the updated map includes boundary information associated with at least one of the first polygon or the second polygon, the boundary information indicating an edge of a drivable area.

16. The one or more non-transitory computer-readable media of claim 14, the operations comprising:

converting the updated map to serialized map data, the serialized map data comprising identifiers representing drivable areas; and providing the serialized map data to a vehicle, the vehicle configured to deserialize the serialized map data for use in controlling the vehicle.

17. The one or more non-transitory computer-readable media of claim 14, the operations comprising:

generating, based at least in part on the map data, a data structure identifying pairs of overlapping, non-interacting traversable surfaces; and determining the updated map based at least in part on the data structure.

18. The one or more non-transitory computer-readable media of claim 14, wherein the first traversable surface or second traversable surface comprise one or more of: a road segment, a parking lot, a parking spot, a parking lane, a driveway, a bike lane, a junction, a sidewalk, a pedestrian overpass, or a pedestrian underpass.

19. The one or more non-transitory computer-readable media of claim 14, wherein determining the first polygon comprises:

determining a longitudinal dimension of the first polygon based at least in part on control points associated with the first traversable surface; and determining a lateral dimension of the first polygon based at least in part on a width associated with the first traversable surface.

20. The one or more non-transitory computer-readable media of claim 14, the operations comprising:

dividing the map data into a hierarchy of spatial tiles.

* * * * *